US012407982B1

(12) United States Patent
Thorson et al.

(10) Patent No.: US 12,407,982 B1
(45) Date of Patent: Sep. 2, 2025

(54) OPTIMAL MICROPHONE SELECTION ON A REMOTE SPEAKER/MICROPHONE (RSM) ASSEMBLY

(71) Applicant: Relay, Inc., Raleigh, NC (US)

(72) Inventors: Dean Thorson, Grayslake, IL (US); Bokchain Koh, Crystal Lake, IL (US); Matthew Newton, Park Ridge, IL (US); Michael Oltmanns, Dyersville, IA (US)

(73) Assignee: Relay, Inc., Raleigh, NC (US)

( * ) Notice: Subject to any disclaimer, the term of this patent is extended or adjusted under 35 U.S.C. 154(b) by 0 days.

(21) Appl. No.: 19/233,345

(22) Filed: Jun. 10, 2025

(51) Int. Cl.
*H04R 3/00* (2006.01)

(52) U.S. Cl.
CPC .................................... *H04R 3/005* (2013.01)

(58) Field of Classification Search
CPC ...................................................... H04R 3/005
USPC ............................ 381/56, 58, 91, 94.1, 94.7
See application file for complete search history.

(56) References Cited

U.S. PATENT DOCUMENTS

2009/0190769 A1* 7/2009 Wang ....................... H03G 3/32 381/66
2013/0216050 A1* 8/2013 Chen ........................ H04B 3/23 381/56
2013/0272540 A1* 10/2013 Hgren ....................... H04R 3/00 381/94.1
2013/0332156 A1* 12/2013 Tackin ................. H03G 3/3005 704/226
2015/0172811 A1* 6/2015 Sassi ................... H04M 1/6041 381/71.1
2019/0069083 A1* 2/2019 Salehin .................. H04R 3/005
2021/0144469 A1* 5/2021 Zhao .................... H04R 1/1075

FOREIGN PATENT DOCUMENTS

GB 2583028 A * 10/2020 ............... H04S 3/02

* cited by examiner

*Primary Examiner* — William A Jerez Lora
(74) *Attorney, Agent, or Firm* — Gregory Stephens

(57) ABSTRACT

Techniques are disclosed for selecting one or more microphones on a remote speaker/microphone (RSM) assembly for input to an audio processing algorithm. An up orientation for the RSM is determined based on an embedded orientation sensor. For each microphone on the RSM, an up distance relative to the orientation sensor is determined based on a stored fixed mapping of microphone locations and current orientation of the orientation sensor, the microphone locations being fixed and known relative to the orientation sensor. Each microphone on the RSM is ranked from the uppermost to the lowermost. The uppermost microphone on the RSM assembly is then selected to serve as a voice input microphone while the microphone located furthest from the voice input microphone is selected to serve as a noise input microphone. A first audio input from the selected voice input microphone is then connected to an audio processing algorithm and a second audio input from the selected noise input microphone is connected to the audio processing algorithm.

21 Claims, 6 Drawing Sheets

FIG. 2A
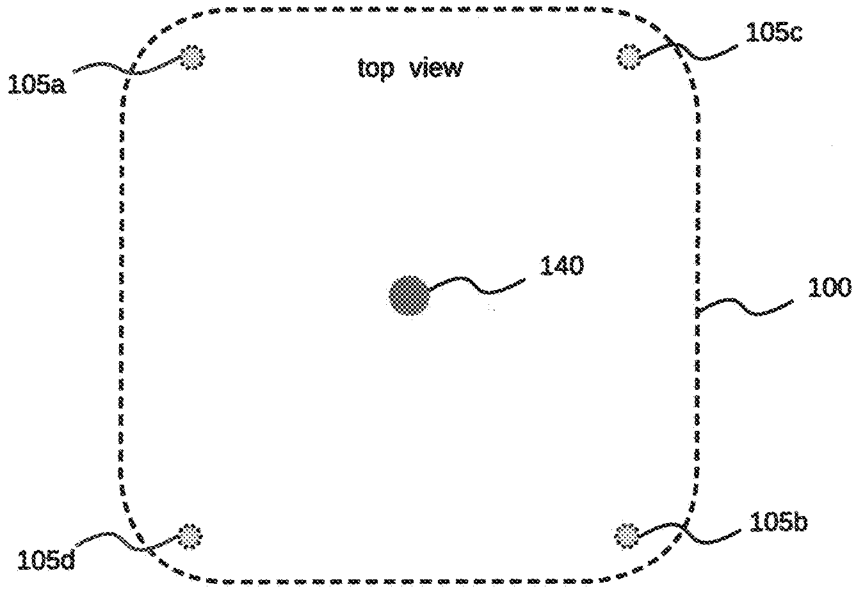
FIG. 2B
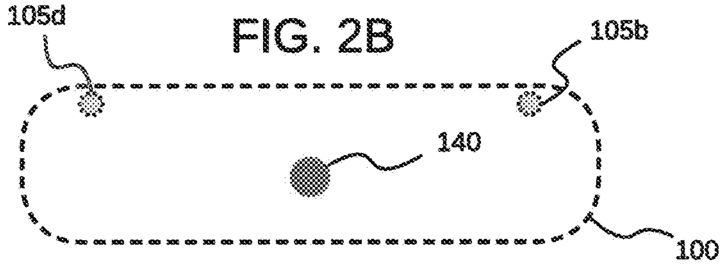
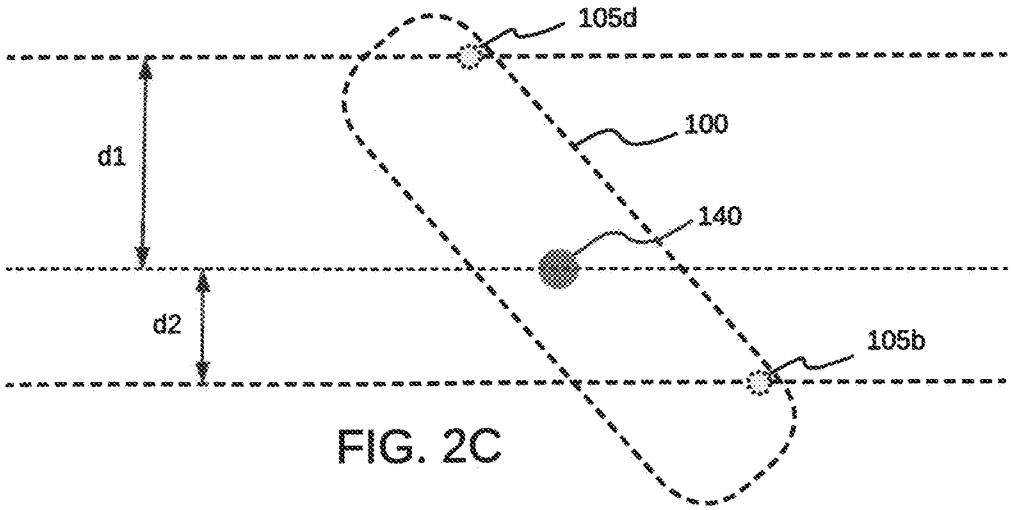
FIG. 2C

OPTIMAL MICROPHONE SELECTION ON A REMOTE SPEAKER/MICROPHONE (RSM) ASSEMBLY

BACKGROUND OF THE INVENTION

Portable communication devices (PCDs) like the ones made by Relay, Inc. operate like walkie-talkies. A user presses and holds a button to transmit and releases to receive audio. The user typically will hold the PCD up in proximity but not too close to the mouth for optimal audio quality. Often, however, a user may wish to affix or clip the microphone and speaker to clothing on their upper torso making for a more convenient mode of operation. Doing so necessitates the use of an accessory coupled with the PCD termed herein as a remote shoulder microphone (RSM). It is impractical to affix the PCD to the clothing in that particular area of the torso.

As mentioned, the RSM is normally mounted on the upper torso of a user's clothing or uniform, placing the microphone(s) of the RSM below but still near the user's mouth. However, because of personal preference, the orientation of the RSM can vary. While the RSM may have a standard orientation (i.e., up/down/left/right), the actual orientation may not align depending on how the user chooses to wear the RSM. For instance, the RSM typically includes a cord/cable connecting the RSM with the PCD. The PCD may be more typically affixed at belt level. In one configuration, the RSM may then be worn over the shoulder with the cable running up the back of the user. This inverts the up/down/left/right orientation of the RSM. Sometimes the RSM may be affixed in an askew (e.g., sideways) position which may also materially differ from the standard orientation.

The RSM may be equipped with echo canceling and noise reduction algorithms designed to enhance the audio quality of the RSM. Echo cancellation primarily tackles the issue of sound from a speaker being picked up by a microphone and retransmitted, causing a distracting echo. Algorithms for this typically involve an adaptive filter that models the echo path and generates an estimate of the echo. This estimated echo is then subtracted from the microphone's input signal. Noise reduction focuses on reducing unwanted background sounds to make desired audio like speech more intelligible. Common noise reduction methods include spectral subtraction, where an estimate of the noise's frequency spectrum is removed from the overall audio spectrum. Other approaches involve various types of filters, including adaptive filters, and increasingly, machine learning algorithms.

Lots of microphone assemblies (including the RSM described herein) utilize audio processing algorithms such as, for instance, echo cancellation and noise suppression (ECNS) to improve the sound quality of the audio that is input. The audio processing algorithms generally require two microphones to function. A first microphone is for voice input and a second microphone is for noise input. The microphones are normally physically mounted opposite one another on the device for acoustic isolation.

Sometimes, like in the inverted position described earlier, the fixed voice input microphone can be positioned away from the mouth, with the noise microphone positioned close. This positioning confuses the audio processing software and minimizes its effectiveness. The solutions described and claimed herein are directed toward the selection of the voice microphone vs. the noise reduction microphone when implementing an audio processing algorithm such as ECNS—not the actual ECNS algorithms. The specification describes a technique using a gyroscope and accelerometer sensor and measured phone orientation to choose the input and noise reduction microphones, not digital signal processing.

Other techniques utilize a hardware based dual-microphone digital signal processing selection algorithm that estimates speech energy on both microphones before selecting which one to use as the input microphone and which one to use as the noise suppression microphone. This technique is typically performed relatively slowly in an attempt to minimize power consumption.

What is needed is a means for selecting, on an RSM device, which microphone should be the input microphone and which microphone should be the noise suppression microphone for a noise reduction algorithm such as ECNS that can switch among a plurality of microphones faster and with much less power used.

SUMMARY OF THE INVENTION

The embodiments herein describe a method, system, and computer program product for selecting one or more microphones on a remote speaker/microphone (RSM) assembly for input to a noise reduction algorithm.

In one embodiment, a method comprises determining an up orientation for the RSM based on an embedded orientation sensor. This is followed by accessing a stored fixed mapping of microphone locations, the microphone locations being fixed and known relative to the orientation sensor. For each microphone on the RSM, an up distance may be determined relative to the orientation sensor based on the stored fixed mapping of microphone locations and current orientation of the orientation sensor. Each microphone on the RSM may be ranked from the uppermost to the lowermost. The uppermost microphone on the RSM assembly may then be selected to serve as a voice input microphone. The microphone located furthest from the voice input microphone may be selected to serve as a noise input microphone. A first audio input from the selected voice input microphone may be connected to a noise reduction algorithm. A second audio input from the selected noise input microphone may be connected to the noise reduction algorithm.

In another embodiment, the orientation sensor includes at least one of an accelerometer or a gyroscope.

In yet another embodiment, the noise reduction algorithm may be one of an echo cancellation and noise suppression (ECNS) algorithm or a speech recognition algorithm.

In still another embodiment, the RSM assembly includes an even number of microphones organized in pairs, wherein each microphone pair is fixed opposite one another where the first microphone in the pair is furthest from the second microphone in the pair such that any other microphones on the RSM assembly are closer to the either microphone in the pair.

In still another embodiment, the internal mapping of microphone locations and orientation sensor is a 3-dimensional database.

In still another embodiment, the steps of the method are repeated upon the detection of motion based on output from the orientation sensor.

In yet another embodiment, a system comprised of a set of one or more processors; and a memory operatively coupled to the set of one or more processors and comprising code executable by the set of one or more processors to determine an up orientation for the RSM based on an embedded orientation sensor. The system may access a stored fixed mapping of microphone locations, the microphone locations being fixed and known relative to the orientation sensor. For each microphone on the RSM, the system may determine an up distance relative to the orientation sensor based on the stored fixed mapping of microphone locations and current orientation of the orientation sensor. The system may rank each microphone on the RSM from the uppermost to the lowermost. The system may then select the uppermost microphone on the RSM assembly to serve as a voice input microphone. The microphone located furthest from the voice input microphone may be selected by the system to serve as a noise input microphone. A first audio input from the selected voice input microphone may be connected to a noise reduction algorithm and a second audio input from the selected noise input microphone may be connected to the noise reduction algorithm by the system.

BRIEF DESCRIPTION OF THE DRAWINGS

FIG. 2A illustrates a top view of the inside of an RSM assembly showing microphone and accelerometer placement according to an embodiment of the invention.

FIG. 2B illustrates a first side view of the inside of an RSM assembly showing microphone and accelerometer placement according to an embodiment of the invention.

FIG. 2C illustrates a second side view of the inside of an RSM assembly showing microphone and accelerometer placement according to an embodiment of the invention.

DETAILED DESCRIPTION OF THE INVENTION

The present invention relates to determining which microphone should be the input microphone and which microphone should be the noise suppression microphone for an ECNS algorithm to optimize noise canceling for a remote shoulder microphone (RSM) assembly. The RSM is coupled (wired or wirelessly) to a personal communication device (PCD) to allow for more convenient usage of the PCD for some users.

There are two approaches considered herein to enhance the effectiveness of the noise reduction algorithms for devices like the RSM assembly. A first approach would be to perform the noise reduction algorithm twice for each normal optimization period, then choose the input based upon the results (i.e., the solution with the best noise suppression). This approach requires relatively significant digital processing power, materially impacts battery life, and is not guaranteed to provide an optimum result.

The second approach, which is the subject of this disclosure, is to eliminate the complex digital signal processing and use the physical characteristics of the device and its internal sensors to choose the proper microphone to be the "voice" input and the proper microphone to be the noise suppression input. Because the positioning of the RSM on the body of the user will always be below the mouth level, a physical orientation determination solution is possible.

The RSM assembly described herein includes multiple (even numbered) microphones as well as a sensor such as an accelerometer/gyroscope. Each microphone pair is situated on the device opposite of one another. A three-dimensional orientation among the sensor and the plurality of microphones is fixed and known and may be stored in a microphone location database.

Selecting the microphone to use as voice input involves determining, via the sensor, which direction is up. Once that is known, a lookup into the microphone location database is made that determines which microphone is currently the furthest in the "up" position based on the fixed and known orientation. This microphone is then deemed the best for voice input. The noise suppression microphone is then chosen as the one opposite to (i.e. furthest from) the voice input microphone. This is a fast and extremely low-power solution that results in the optimum selection for voice input.

Figure 1A:
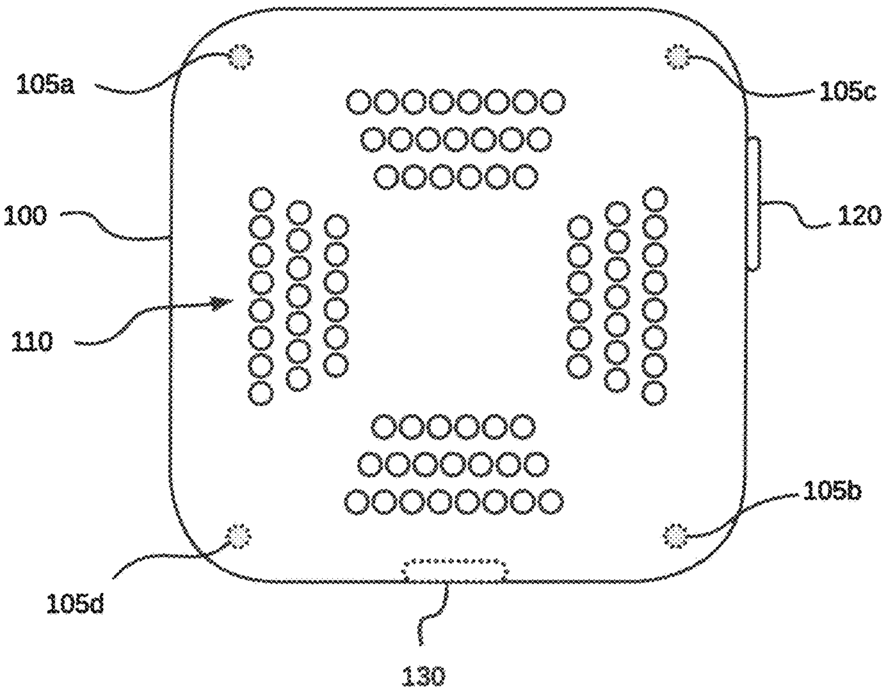
FIG. 1A illustrates an exterior top view of an RSM assembly according to an embodiment of the invention.

FIG. 1A illustrates an exterior top view of an RSM 100 according to an embodiment of the invention. In this view, the RSM 100 includes four (4) microphones 105*a-d*, a pattern of holes 110 to allow for a speaker assembly (not shown) to output audio, a push-to-talk (PTT) button 120, and a hidden port 130. The hidden port 130 may be used to power/recharge the RSM 100 as well as couple the RSM 100 to the PCD (not shown) via a cable (not shown). The PTT button 120 is used by the user to engage and disengage transmission mode for the PCD via the RSM 100. The RSM 100 further includes one or more processors for executing one or more algorithms, including those mentioned in this description.

Figure 1B:
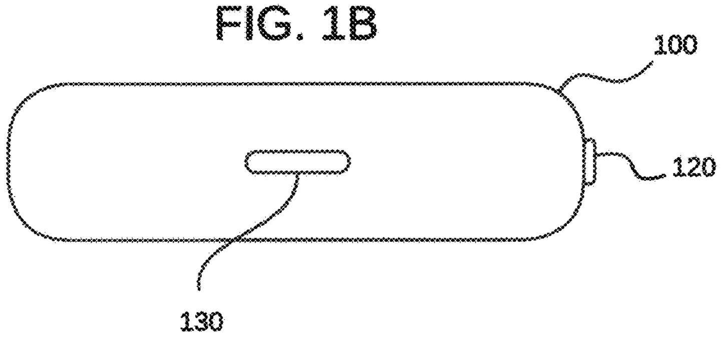
FIG. 1B illustrates an exterior side view of an RSM assembly according to an embodiment of the invention

FIG. 1B illustrates an exterior side view of the RSM 100 according to an embodiment of the invention showing another view of PTT button 120 and port 130.

Figure 1C:
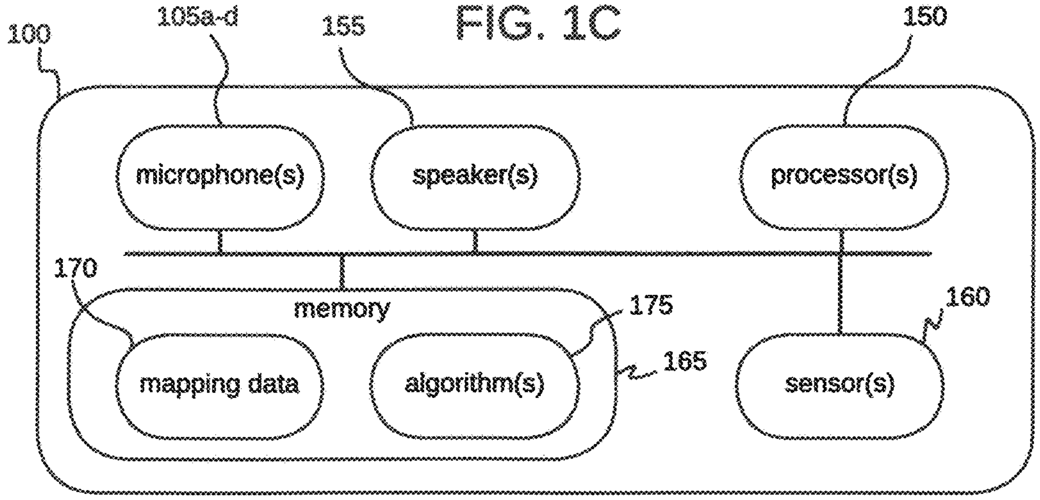
FIG. 1C illustrates some of the interior components of an RSM assembly according to an embodiment of the invention

FIG. 1C illustrates some of the interior components of an RSM 100 according to an embodiment of the invention. In addition to the previously identified microphone(s) 105*a-d*, the RSM 100 further includes one or more speakers 155, one or more processors 150, one or more sensors 160, a memory component 165. The memory component may store mapping data 170 and one or more noise reduction algorithms 175.

The mapping data 170 may comprise data points that indicative of a three-dimensional orientation of the microphones 105*a-d* relative to the sensor(s) 140. Mapping data 170 can be used to determine which particular microphone among 105*a-d* is positioned most upward given a current sensor 140 orientation. Noise reduction algorithms 175 may comprise, for instance, echo cancellation and noise suppression (ECNS) algorithms that receive voice input from a first microphone and noise input from a second microphone. The selection of which microphone to serve as the voice input and which microphone to serve as the noise input is the subject of the present description. The sensor(s) 140 may include either or both of a gyroscope or an accelerometer. In operation, processor(s) 150 receive orientation data from sensor(s) 140 to determine which direction is currently up. Processor(s) 150 may then consult mapping data 170 to determine which microphone 105*a-d* is currently the most upward based on the determined current sensor 140 orientation. This microphone is then deemed the voice input while its paired microphone is deemed the noise input microphone by virtue of being located furthest from the voice input microphone. Processor(s) 150 then process, using the noise reduction algorithms 175, the input signal from the voice input and noise input microphones.

FIG. 2A illustrates a top view of the inside of an RSM 100 showing microphone 105(*a-d*) and accelerometer 140 placement according to an embodiment of the invention.

FIG. 2B illustrates a first side view of the inside of an RSM 100 showing microphones 105(*a-d*) and sensor 140 placement according to an embodiment of the invention. The sensor 140 may be an accelerometer and/or a gyroscope and is affixed in a known position and orientation relative to microphones 105*a-d*.

FIG. 2C illustrates a second side view of the inside of an RSM 100 showing two microphones (105*d* and 105*b*) and sensor 140 placement according to an embodiment of the invention. In this depiction, a first vertical distance (d1) upward between sensor 140 and microphone 105*d* and a second vertical distance (d2) downward between sensor 140 and microphone 105*b* is illustrated.

Figure 3:
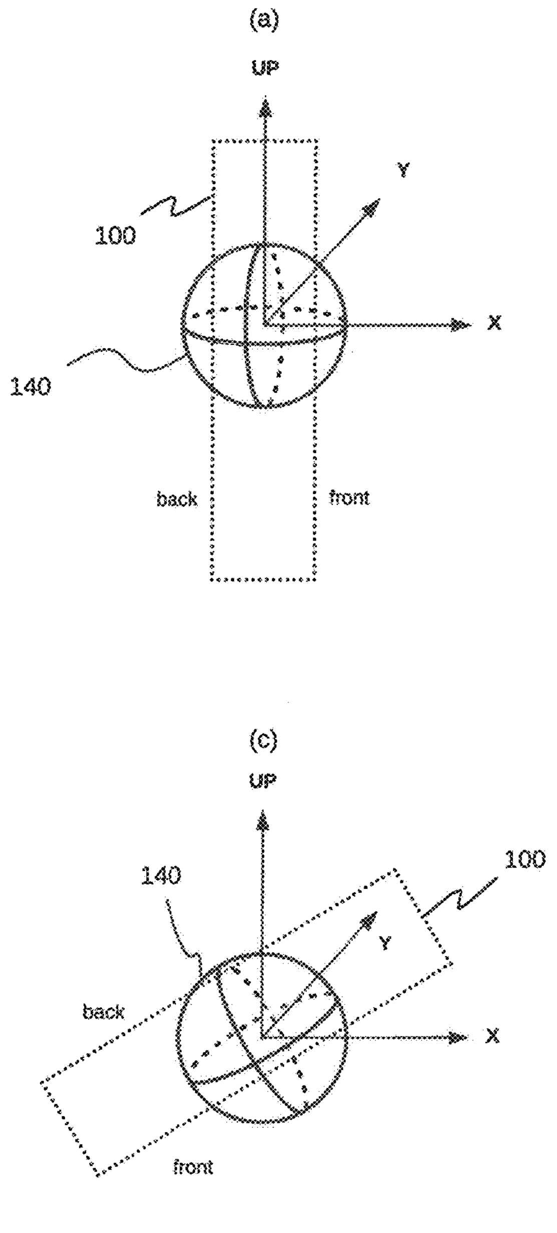
FIG. 3 illustrates the accelerometer in four different exemplary orientations according to an embodiment of the invention.

FIG. 3 illustrates a sensor 140 in four different exemplary orientations within the RSM 100 according to an embodiment of the invention. Each exemplary sensor orientation includes an X-Y-Z coordinate axis in which the z-axis is labeled as "up". In the first exemplary orientation (a), sensor 140 may be characterized as in a standard upright orientation based on the front/back characterization of the RSM 100 which would correspond to the RSM 100 being mostly upright. In the second exemplary orientation (b), sensor 140 may be characterized as tilted slightly to the right or slightly downward based on the front/back characterization of the RSM 100 which would correspond to the RSM 100 being angled as shown. In the third exemplary orientation (c), sensor 140 may be characterized as tilted more to the right or more downward based on the front/back characterization of the RSM 100 which would correspond to the RSM 100 being angled as shown. In the fourth exemplary orientation (d), sensor 140 may be characterized as tilted to the left or downward based on the front/back characterization of the RSM 100 which would correspond to the RSM 100 being angled as shown.

Figure 4:
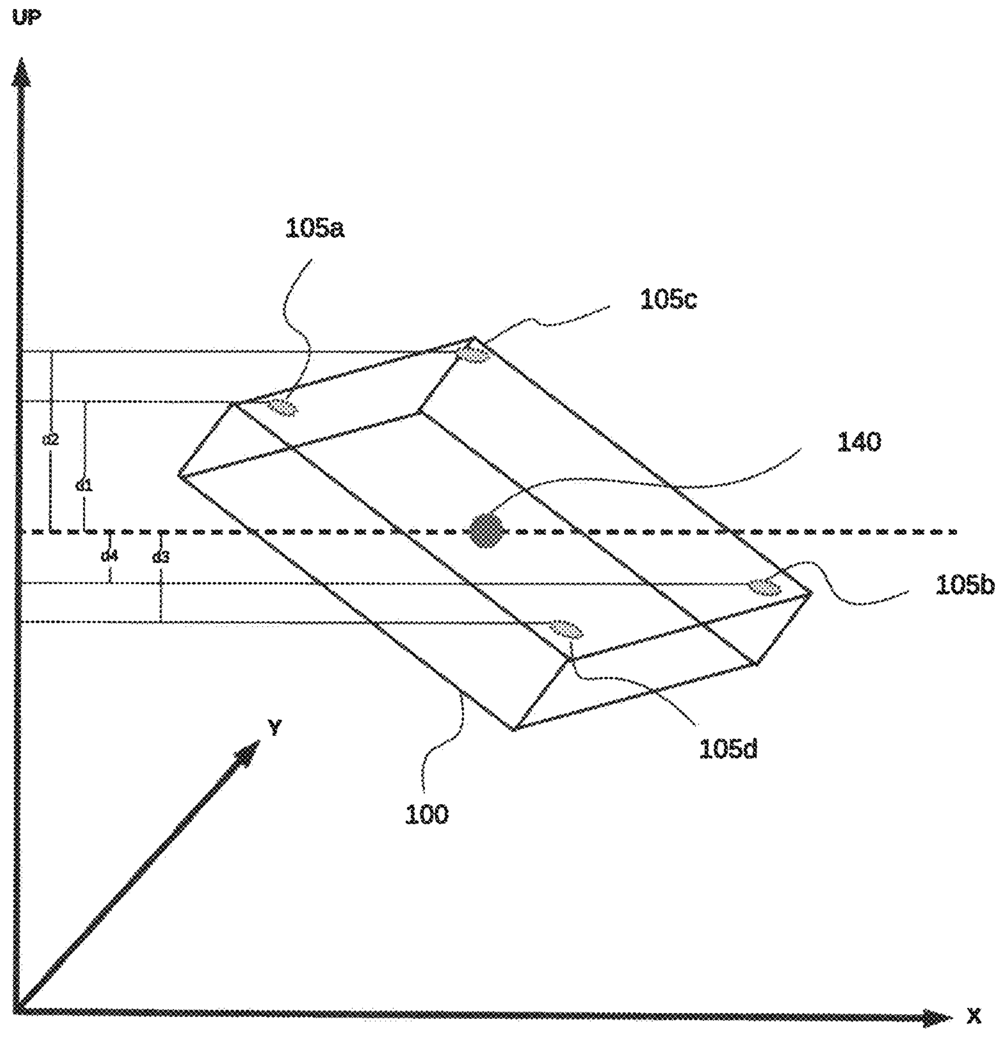
FIG. 4 illustrates a perspective view of the inside of an RSM assembly showing microphone and accelerometer placement with respect to an x-y-x coordinate system according to an embodiment of the invention.

FIG. 4 illustrates a perspective view of the inside of an RSM 100 showing microphone 105(*a-d*) and sensor 140 placement with respect to an x-y-x coordinate system according to an embodiment of the invention. In this depiction, a first vertical distance (d1) upward between sensor 140 and microphone 105*a*, a second vertical distance (d2) upward between sensor 140 and microphone 105*c*, a third vertical distance (d3) downward between sensor 140 and microphone 105*d*, and a fourth vertical distance (d4) downward between sensor 140 and microphone 105*b* is illustrated. Based on the orientation of the RSM 100 relative to the X-Y-UP axis, microphone 105*c* is the furthest "up" and would be the microphone selected as the voice input microphone for the RSM 100. Microphone 105*a* is paired with microphone 105*b* meaning they are separated the furthest from one another. Similarly, microphone 105*c* is paired with microphone 105*d* such that they too are separated the furthest from one another. Thus, whichever microphone 105*a-d* is selected as the voice input by virtue of being the most "up", its paired microphone will be selected as the noise suppression microphone for purposes of ECNS algorithms.

Figure 5:
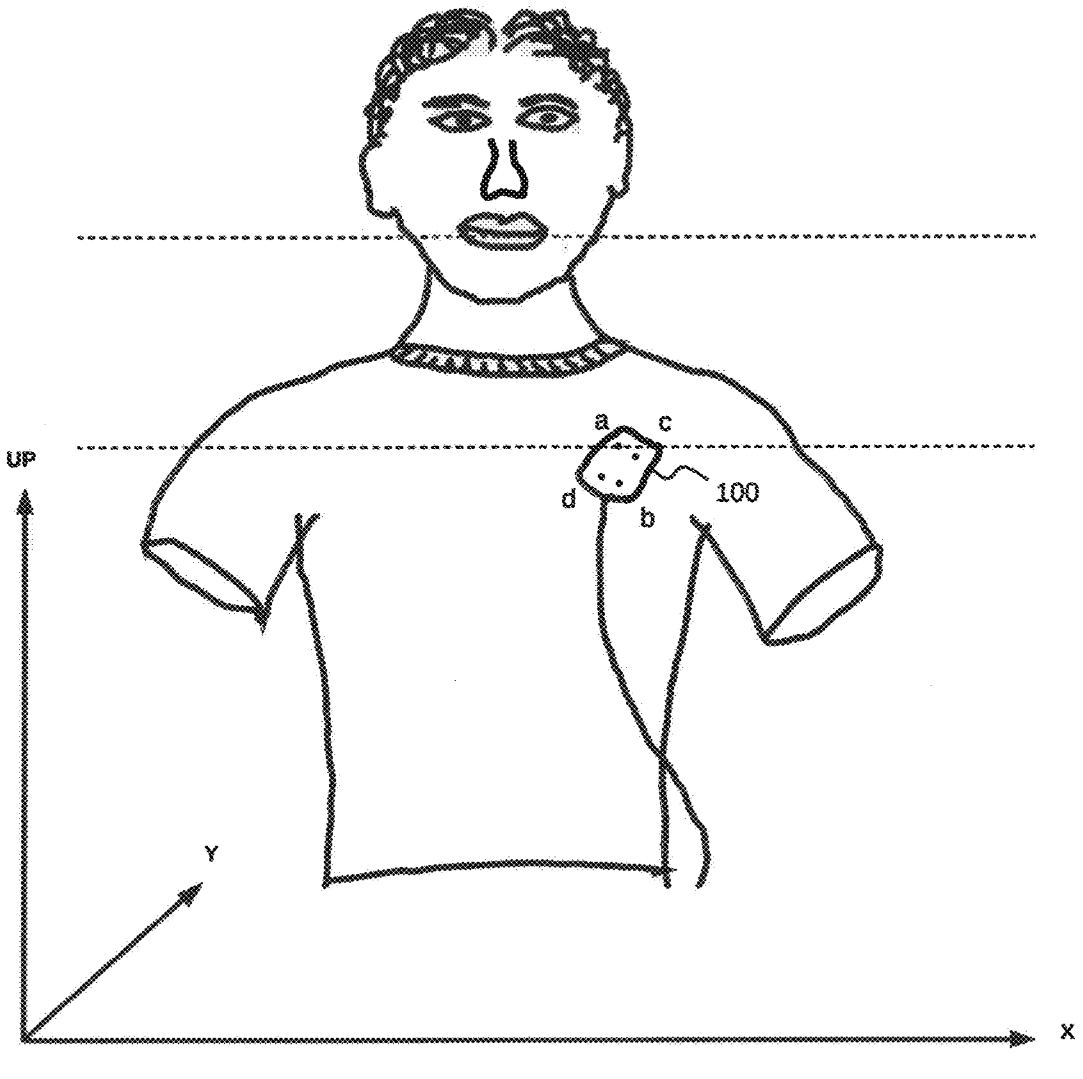
FIG. 5 illustrates a user wearing the RSM in one exemplary orientation according to an embodiment of the invention.

FIG. 5 illustrates a user wearing the RSM 100 in one exemplary orientation according to an embodiment of the invention. In this example, the user has chosen to wear the RSM 100 close to a standard upright orientation rather than an inverted over the shoulder orientation. The four microphones (105*a-d*) are shown simply as a, b, c, and d for simplicity. Microphone (a) is in the most upright position followed by (c), (d), and (b). Thus, microphone (a) will be selected as the voice input microphone. Moreover, the microphones have been paired together—(a) with (b) and (c) with (d)—such that they are physically located opposite and furthest away from one another. Therefore, when microphone (a) is chosen as the voice input, microphone (b) will automatically be selected as the noise suppression input microphone for the ECNS algorithm(s).

Figure 6:
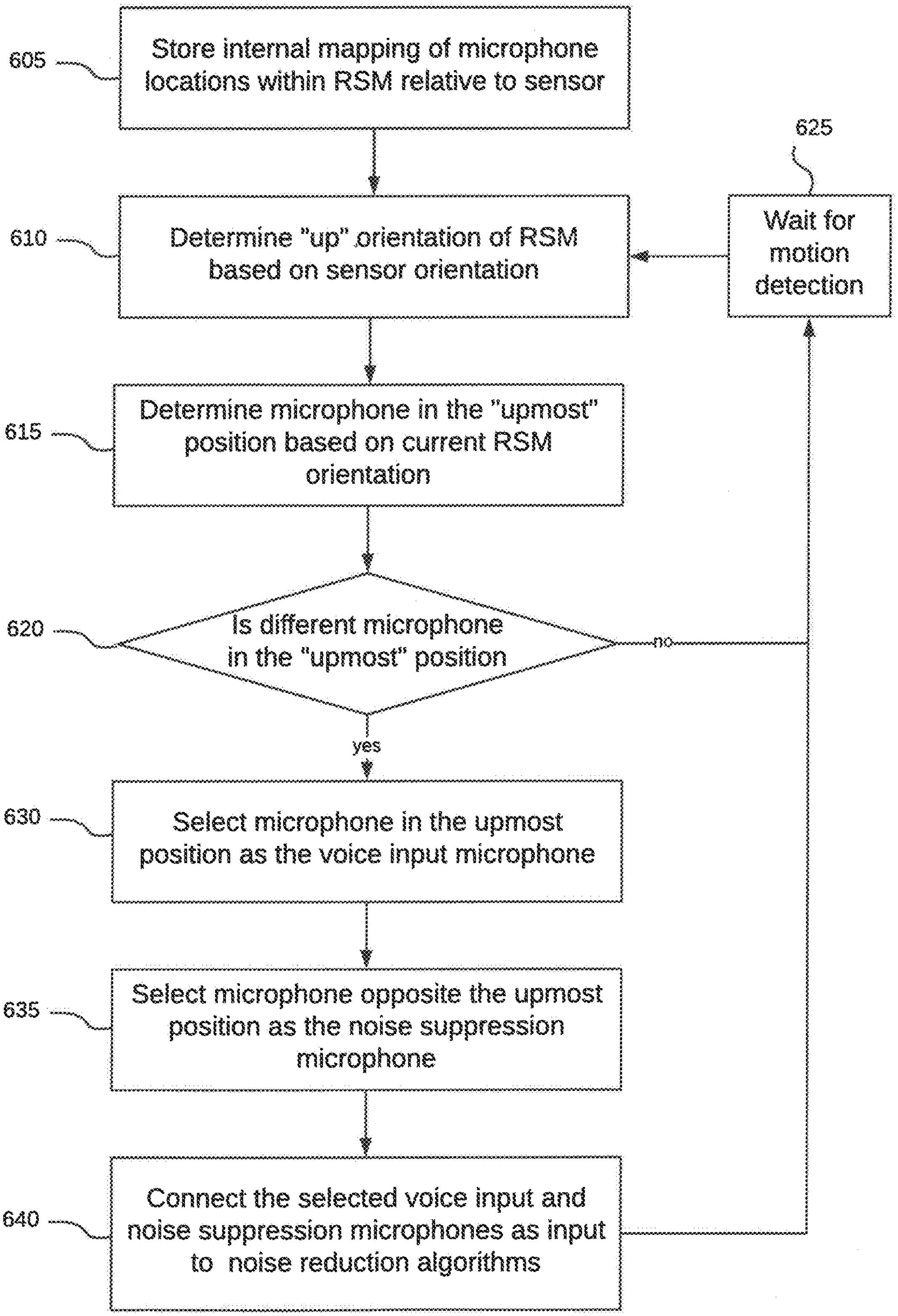
FIG. 6 illustrates a logic flow diagram describing the selection of a microphone based on the orientation of the RSM with a user according to an embodiment of the invention.

FIG. 6 illustrates a logic flow diagram describing the selection of a microphone 105(*a-d*) based on the orientation of the RSM 100 with a user according to an embodiment of the invention. More specifically, the logic flow diagram describes the selection of a voice input microphone and a noise suppression input microphone to be used as the input microphones for echo cancellation and noise suppression (ECNS) algorithm(s).

In block 605, the RSM 100 has stored within local memory a mapping of the microphone locations 105*a-d* and the sensor 140 within the RSM 100. This mapping data 170 may be embedded in memory 165 based on a known fixed orientation among the microphones 105*a-d* and the sensor(s) 140.

In block 610, the "up" orientation of the RSM 100 may be determined based on the current sensor 140 orientation. Once the up orientation of sensor 140 is determined, processors 150 may determine which microphone among 105*a-d* is positioned uppermost based on mapping data 170 in block 615.

If this is the initial instance such as the beginning of a conversation using the RSM 100, the process may skip ahead to block 630. However, if a pair of microphones (voice and noise) has already been selected, a determination may be made, in decision block 620, as to whether the microphone currently in the upmost position as determined in block 615 is different from the microphone that is currently being used as the voice input microphone. If they are the same, control of the process forks to block 625 where it waits until the sensor 140 detects motion that may be indicative of a change in orientation. Once such motion is detected, control returns to block 610 to determine the up orientation for sensor 140.

If the microphone in decision block 620 is different from the current voice microphone, the microphone determined in block 615 may then be selected as the new voice input microphone in block 630. Selecting this microphone as the most optimal will always be true because the RSM 100 will always be positioned beneath the user's mouth. Thus, the uppermost microphone is, by default, the one closest to the user's mouth meaning it is most appropriate to serve as the voice input microphone. In addition, the microphone opposite to the voice input microphone is the ideal microphone to serve as the noise input microphone due to its fixed location furthest from the selected voice input microphone. The opposite microphone is then selected as the noise input microphone in block 635. Recall, microphones 105*a-d* have been arranged in pairs 105*a* with 105*b* and 105*c* with 105*d*. These pairs have been specifically linked as they are fixed opposite and furthest away from one another such that in any orientation microphone 105*b* will always be further from microphone 105*a* than microphones 105*c* and 105*d*. Similarly, microphone 105*c* will always be further from microphone 105*d* than microphones 105*a* and 105*b*.

Once the voice input and noise input microphones have been determined, each is connected via the processor(s) 150 to the noise reduction algorithms 175 in block 640 using a dynamic audio routing process. Dynamic audio routing propagates the signal from the selected microphone (e.g., 105*a-d*) to the processor(s) 150. Dynamic audio routing captures a raw audio stream (e.g., voice and noise) at the respective selected microphones and directs the raw audio to a noise reduction algorithm. The noise reduction algorithms may then process the raw audio inputs. The processed audio outputs may then be routed to their final destination to provide the best results regarding audio clarity and noise cancellation for the RSM 100.

One such noise reduction algorithm may be an echo cancellation and noise suppression (ECNS) algorithm. Another such noise reduction algorithm may be a speech recognition algorithm.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" or "the" preceding an element does not exclude the presence of a plurality of such elements. The mere fact that certain elements are recited in mutually different dependent claims does not indicate that these elements cannot be used in combination. The word "about" or similar relative term as applied to numbers includes ordinary (conventional) rounding of the number with a fixed base such as 5 or 10.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized or omitted as appropriate, as the explicit illustrated examples are used only for descriptive purposes and are not to be construed as limiting.

As used herein, the statement that two or more parts or components are "coupled" shall mean that the parts are joined or operate together either directly or indirectly, e.g., through one or more intermediate parts or components, so long as a link occurs. As used herein, "operatively coupled" means that two or more elements are coupled to operate together or are in communication, unidirectional or bidirectional, with one another. As used herein, the term "number" shall mean one or an integer greater than one (i.e., a plurality). As used herein a "set" shall mean one or more.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method for selecting one or more microphones on a remote speaker/microphone (RSM) assembly for input to a noise reduction algorithm, the method comprising:

determining an up orientation for the RSM based on an embedded orientation sensor;

accessing a stored fixed mapping of microphone locations, the microphone locations being fixed and known relative to the orientation sensor;

determining, for each microphone on the RSM, an up distance relative to the orientation sensor based on the stored fixed mapping of microphone locations and current orientation of the orientation sensor;

ranking each microphone on the RSM from the uppermost to the lowermost;

selecting the uppermost microphone on the RSM assembly to serve as a voice input microphone;

selecting the microphone located furthest from the voice input microphone to serve as a noise input microphone;

connecting a first audio input from the selected voice input microphone to a noise reduction algorithm; and connecting a second audio input from the selected noise input microphone to the noise reduction algorithm.

2. The method of claim 1, wherein the orientation sensor includes at least one of an accelerometer or a gyroscope.

3. The method of claim 2, wherein the noise reduction algorithm is an echo cancellation and noise suppression (ECNS) algorithm.

4. The method of claim 2, wherein the noise reduction algorithm is a speech recognition algorithm.

5. The method of claim 1, wherein the RSM assembly includes an even number of microphones organized in pairs, wherein each microphone pair is fixed opposite one another where the first microphone in the pair is furthest from the second microphone in the pair such that any other microphones on the RSM assembly are closer to the either microphone in the pair.

6. The method of claim 1, wherein the internal mapping of microphone locations and orientation sensor is a 3-dimensional database.

7. The method of claim 6, wherein, upon detecting a change in the up orientation for the RSM, control is returned to the step of determining, for each microphone on the RSM, an up distance relative to the orientation sensor based on the stored fixed mapping of microphone locations and current orientation of the orientation sensor.

8. A system for selecting one or more microphones on a remote speaker/microphone (RSM) assembly for input to a noise reduction algorithm, the system comprising:

a set of one or more processors; and a memory operatively coupled to the set of one or more processors and comprising code executable by the set of one or more processors to:

determine an up orientation for the RSM based on an embedded orientation sensor;

access a stored fixed mapping of microphone locations, the microphone locations being fixed and known relative to the orientation sensor;

determine, for each microphone on the RSM, an up distance relative to the orientation sensor based on the stored fixed mapping of microphone locations and current orientation of the orientation sensor;

rank each microphone on the RSM from the uppermost to the lowermost;

select the uppermost microphone on the RSM assembly to serve as a voice input microphone;

select the microphone located furthest from the voice input microphone to serve as a noise input microphone;

connect a first audio input from the selected voice input microphone to a noise reduction algorithm; and connect a second audio input from the selected noise input microphone to the noise reduction algorithm.

9. The system of claim 8, wherein the orientation sensor includes at least one of an accelerometer or a gyroscope.

10. The system of claim 9, wherein the noise reduction algorithm is an echo cancellation and noise suppression (ECNS) algorithm.

11. The system of claim 9, wherein the noise reduction algorithm is a Speech Recognition algorithm.

12. The system of claim 8, wherein the RSM assembly includes an even number of microphones organized in pairs, wherein each microphone pair is fixed opposite one another where the first microphone in the pair is furthest from the second microphone in the pair such that any other microphones on the RSM assembly are closer to the either microphone in the pair.

13. The system of claim 8, wherein the internal mapping of microphone locations and orientation sensor is a 3-dimensional database.

14. The system of claim 13, wherein, upon detecting a change in the up orientation for the RSM, control is returned to the executable code that determines, for each microphone on the RSM, an up distance relative to the orientation sensor based on the stored fixed mapping of microphone locations and current orientation of the orientation sensor.

15. A computer program product for selecting one or more microphones on a remote speaker/microphone (RSM) assembly for input to a noise reduction algorithm, comprising:

a non-transitory storage medium having computer executable program code comprising:

code that determines an up orientation for the RSM based on an embedded orientation sensor;

code that accesses a stored fixed mapping of microphone locations, the microphone locations being fixed and known relative to the orientation sensor;

code that determines, for each microphone on the RSM, an up distance relative to the orientation sensor based on the stored fixed mapping of microphone locations and current orientation of the orientation sensor;

code that ranks each microphone on the RSM from the uppermost to the lowermost;

code that selects the uppermost microphone on the RSM assembly to serve as a voice input microphone;

code that selects the microphone located furthest from the voice input microphone to serve as a noise input microphone;

code that connects a first audio input from the selected voice input microphone to a noise reduction algorithm; and code that connects a second audio input from the selected noise input microphone to the noise reduction algorithm.

16. The computer program product of claim 15, wherein the orientation sensor includes at least one of an accelerometer or a gyroscope.

17. The computer program product of claim 16, wherein the noise reduction algorithm is an echo cancellation and noise suppression (ECNS) algorithm.

18. The computer program product of claim 16, wherein the noise reduction algorithm is a Speech Recognition algorithm.

19. The computer program product of claim 15, wherein the RSM assembly includes an even number of microphones organized in pairs, wherein each microphone pair is fixed opposite one another where the first microphone in the pair is furthest from the second microphone in the pair such that any other microphones on the RSM assembly are closer to the either microphone in the pair.

20. The computer program product of claim 15, wherein the internal mapping of microphone locations and orientation sensor is a 3-dimensional database.

21. The computer program product of claim 20, wherein, upon detecting a change in the up orientation for the RSM, control is returned to the executable code that determines, for each microphone on the RSM, an up distance relative to the orientation sensor based on the stored fixed mapping of microphone locations and current orientation of the orientation sensor.

* * * * *